US009740738B1

(12) United States Patent
Kalki

(10) Patent No.: US 9,740,738 B1
(45) Date of Patent: Aug. 22, 2017

(54) DATA RETRIEVAL FROM DATASTORES WITH DIFFERENT DATA STORAGE FORMATS

(71) Applicant: AMAZON TECHNOLOGIES, INC., Seattle, WA (US)

(72) Inventor: Santosh Kalki, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/963,095

(22) Filed: Dec. 8, 2015

Related U.S. Application Data

(63) Continuation of application No. 13/788,057, filed on Mar. 7, 2013, now Pat. No. 9,244,971.

(51) Int. Cl.
*G06F 17/30* (2006.01)
*G06F 3/0482* (2013.01)

(52) U.S. Cl.
CPC ...... *G06F 17/30463* (2013.01); *G06F 3/0482* (2013.01); *G06F 17/30392* (2013.01); *G06F 17/30569* (2013.01)

(58) Field of Classification Search
CPC ......... G06F 17/30595; G06F 17/30312; G06F 17/30386; G06F 17/2247; G06F 17/30321; G06F 17/30424; G06F 17/30539; G06F 17/30589; G06F 17/30864
USPC ....... 706/12, 46, 45, 11, 52; 705/4, 14.53, 3, 705/30, 35, 7.11, 14.49, 26.9, 311, 37, 705/38, 44, 7.12, 7.26, 7.42; 701/400, 701/117, 119, 37, 465, 537, 538; 702/19, 702/81, 84; 707/603, 639, 741, 755, 776, 707/602, 610, 695, 722, 723, 740, 758, 707/769, 790, 796, 797, 798, 802, 812
See application file for complete search history.

(56) References Cited

U.S. PATENT DOCUMENTS

| 5,379,419 | A  | 1/1995  | Heffernan et al. |
| 5,819,251 | A  | 10/1998 | Kremer et al.    |
| 5,940,819 | A  | 8/1999  | Beavin et al.    |
| 6,023,694 | A  | 2/2000  | Kouchi et al.    |
| 6,898,594 | B2 | 5/2005  | Ushijima et al.  |

(Continued)

OTHER PUBLICATIONS

Arumugam, et al., "The DataPath System: A Data-Centric Analytic Processing Engine for Large Data Warehouses", SIGMOD '10, Jun. 6-11, 2010, Indianapolis, Indiana, USA. pp. 519-530. <Retrieved from: http://www.cs.rice.edu/~np6/Papers/Arumugam%20et%20al. %20-%202010%20-%20The%20DataPath%20system.pdf>.

Chen, Michael J., "Spreadsheet-Based Programming Language Adapted for Report Generation", U.S. Appl. No. 61/581,515, filed Dec. 29, 2011.

(Continued)

*Primary Examiner* — Jay Morrison
*Assistant Examiner* — Ken Hoang
(74) *Attorney, Agent, or Firm* — Lindauer Law, PLLC

(57) ABSTRACT

A request that includes a syntax tree is received. A query plan that comprising one or more queries using storage metadata and one or more data attributes obtained from the syntax tree is generated. Individual ones of the one or more queries are used to retrieve at least one of the one or more data attributes from the at least two datastores. The generating of the query plan is generated by modifying individual ones of the one or more queries to access a datastore of the at least two datastores having a lower data retrieval latency. The one or more queries of the query plan are executed to generate the report, the report including data resulting from the executing of the one or more queries.

20 Claims, 10 Drawing Sheets

(56) References Cited

U.S. PATENT DOCUMENTS

| | | | |
|---|---|---|---|
| 7,383,247 B2 | 6/2008 | Li et al. | |
| 7,966,313 B2 | 6/2011 | Bruno et al. | |
| 9,330,141 B2* | 5/2016 | Salch | G06F 17/30463 |
| 2004/0087888 A1 | 5/2004 | DiGianfilippo et al. | |
| 2004/0236653 A1* | 11/2004 | Sokolic | G06F 17/30899 |
| | | | 705/35 |
| 2005/0038812 A1 | 2/2005 | Tirpak et al. | |
| 2006/0053261 A1 | 3/2006 | Prahlad et al. | |
| 2006/0122993 A1* | 6/2006 | Dettinger | G06F 17/30436 |
| 2006/0195424 A1 | 8/2006 | Wiest et al. | |
| 2008/0010381 A1 | 1/2008 | Barraclough et al. | |
| 2008/0271048 A1 | 10/2008 | Fradkov et al. | |
| 2009/0119669 A1 | 5/2009 | Norman et al. | |
| 2010/0318559 A1* | 12/2010 | Yan | G06F 17/30 |
| | | | 707/769 |
| 2011/0029563 A1 | 2/2011 | Coiera et al. | |
| 2012/0179719 A1 | 7/2012 | Coiera | |
| 2012/0215763 A1* | 8/2012 | Hughes | G06F 17/30545 |
| | | | 707/718 |
| 2012/0246154 A1 | 9/2012 | Duan et al. | |
| 2013/0290822 A1 | 10/2013 | Chen | |

OTHER PUBLICATIONS

Hoang, Ken, "Advisory Action dated Jul. 13, 2015", U.S. Appl. No. 13/788,057, The United States Patent and Trademark Office, Jul. 13, 2015.

Hoang, Ken, "Final Office Action dated May 4, 2015", U.S. Appl. No. 13/788,057, The United States Patent and Trademark Office, May 4, 2015.

Hoang, Ken, "Non-Final Office Action dated Nov. 21, 2014", U.S. Appl. No. 13/788,057, The United States Patent and Trademark Office, Nov. 21, 2014.

Hoang, Ken, "Notice of Allowance dated Sep. 10, 2015", U.S. Appl. No. 13/788,057, The United States Patent and Trademark Office, Sep. 10, 2015.

Morrison, Jay A., "Final Office Action dated Mar. 26, 2015", U.S. Appl. No. 13/791,453, The United States Patent and Trademark Office, Mar. 26, 2015.

Morrison, Jay A.,"Non-Final Office Action dated Nov. 5, 2014", U.S. Appl. No. 13/791,453, The United States Patent and Trademark Office, Nov. 5, 2014.

Morrison, Jay A.,"Notice of Allowance dated Jul. 22, 2015", U.S. Appl. No. 13/791,453, The United States Patent and Trademark Office, Jul. 22, 2015.

* cited by examiner

DATA RETRIEVAL FROM DATASTORES WITH DIFFERENT DATA STORAGE FORMATS

CROSS-REFERENCES TO RELATED APPLICATIONS

This application is a continuation of, and claims priority to, U.S. application Ser. No. 13/788,057 entitled "DATA RETRIEVAL FROM HETEROGENEOUS STORAGE SYSTEMS", filed Mar. 7, 2013. U.S. application Ser. No. 13/788,057 is hereby incorporated by reference in its entirety.

BACKGROUND

Commercial enterprises and other organizations often store large amounts of data related to their operations. In some cases, an online business may store terabytes, petabytes, exabytes, or more of data describing products, sale transactions, customers, vendors, online activities of customers, and so forth. Identifying and retrieving desired data from such a large quantity of stored data may be problematic. In particular, data retrieval may be a challenge in environments where data is stored in multiple storage systems that employ different storage formats or technologies. Retrieval may be further complicated in scenarios where the data consumers are not knowledgeable in the particular querying languages used to retrieve data from the various storage systems.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for retrieving data stored in datastores with different data storage formats. The retrieval may be responsive to a data report request that is not associated with any one particular data storage format. As used herein, a datastore describes a data storage system storing any type of data in any type of storage format, using any type of data storage technology. Implementations provide for data retrieval from datastores that include relational databases, such as databases that employ a relational database management system (RDBMS). Implementations also provide for data retrieval from datastores that employ a non-relational storage format, such as a "not only SQL" (NoSQL) database that does not adhere to a relational database model.

Figure 1:
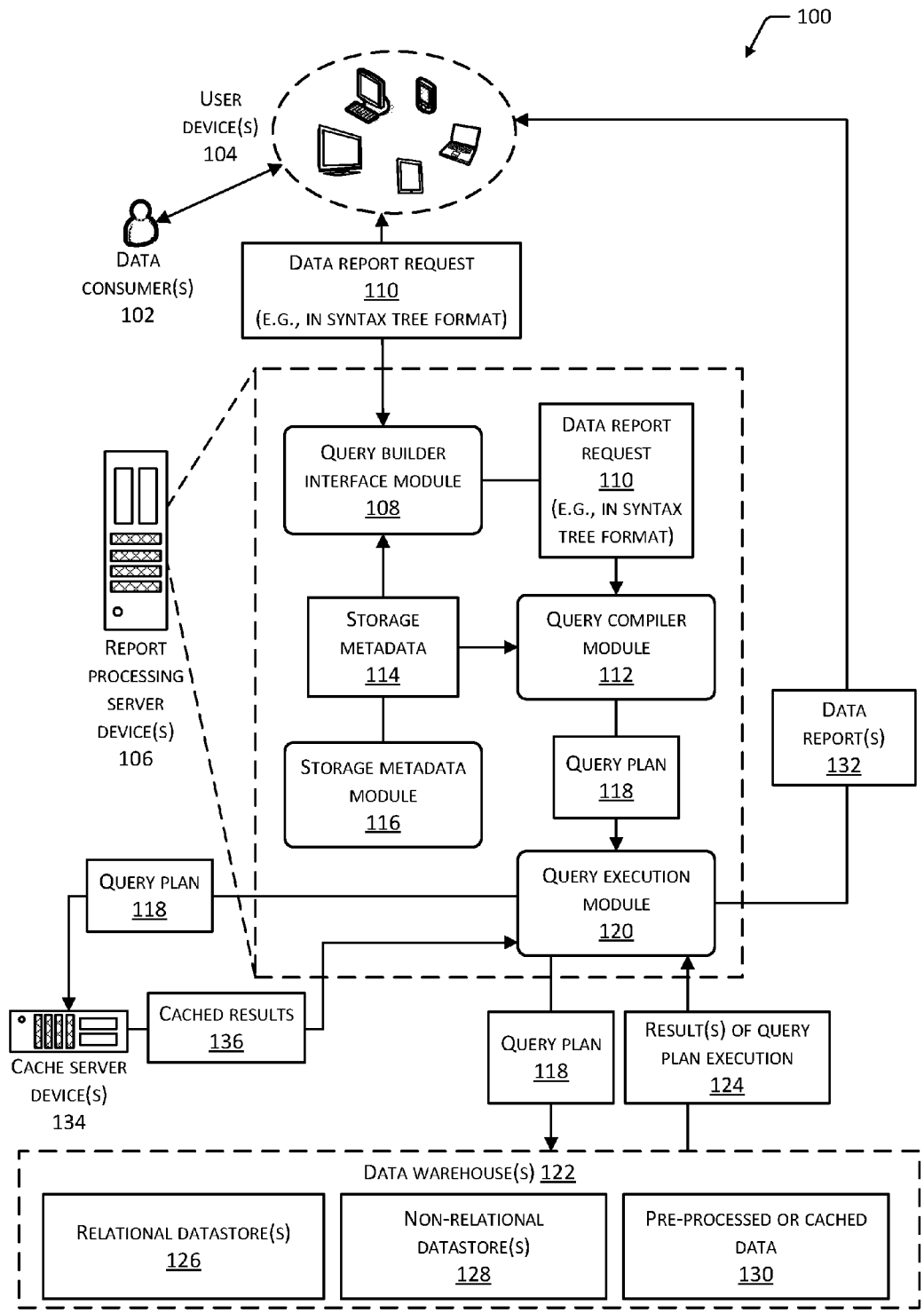
FIG. 1 depicts an environment for retrieving data from disparate storage systems, including user device(s), for requesting and receiving data reports, and report processing server device(s) for generating and executing query plans to retrieve data to include in data reports.

FIG. 1 depicts an environment 100 in which implementations may operate to retrieve data from disparate or heterogeneous storage systems, as described herein. In some implementations, one or more data consumers 102 or other users may employ one or more user devices 104 to communicate with one or more report processing server devices 106. The data consumers 102 may include individuals or groups of individuals who consume the retrieved data. In some cases, the data consumers 102 may be associated with a business or other type of organization. The data consumers 102 may consume data for any purposes, such as to develop processes, systems, services, or products, to analyze or improve business or organizational operations, or for other purposes.

The user device(s) 104 and the report processing server device(s) 106 may include any type of computing device, including but not limited to a smartphone, a personal data assistant (PDA), a tablet computer, a wearable computer, a mobile gaming device, an electronic book reader, an automotive computer, a desktop computer, a personal computer, a laptop computer, a thin client, a terminal, a game console, a smart appliance, a home entertainment device, a mainframe computer, a server computer, a network computer, and so forth. The report processing server device 106 is described further with reference to FIG. 2.

In some implementations, the report processing server device(s) 106 execute a query builder interface module 108, which provides a user interface to enable a user to request a data report to be generated based on data stored in one or more datastores. The user interface may be a graphical user interface, and may enable a data consumer or other user to specify one or more data attributes for data retrieval even if the requesting user does not have the knowledge to write queries in the supported query language of the datastores. An example user interface is described with reference to FIG. 3. As used herein, a data attribute may correspond to a column in a table (e.g., in a relational database) or may correspond to a searchable data element in a non-relational datastore.

The user may also request any number of conditions on the data attributes, to generate data to be included in the data report. For example, the user may request that a report be generated to include data for a data attribute "product identifier," with a condition that the "product identifier" is a particular value or is within a set or range of values. The user interface may further enable a user to request an ordering or sorting of the data in the data report, such that the result data is sorted in an ascending or descending order based on one or more data attributes.

A data report request 110 may be generated to include the requested data attributes, conditions, or ordering, as specified by the requesting user through the user interface. In some implementations, the data report request is in the form of an abstract syntax tree in which the requested data attributes, conditions, and ordering are specified in a hierarchical form. An example format for the syntax tree in the data report request 110 is described with reference to FIG. 4, and a particular example of a syntax tree is described with reference to FIG. 5.

In some implementations, the data report request 110 including the syntax tree is generated through one or more operations (e.g., client-side operations) performed by a web browser or other application executing on the user device 104, and communicated to the query builder interface module 108 executing on the report processing server device(s) 106. Alternatively, the user device 104 may provide the user-specified data attributes, conditions, ordering information, or other information to the query builder interface module 108, which may then generate the data report request 110 including the syntax tree through one or more operations (e.g., server-side operations) executed on the report processing server device(s) 106.

In some cases, the query builder interface module 108 provides a user interface through one or more web pages, and the user device(s) 104 may access the user interface through a web browser such as Mozilla® Firefox®, Microsoft® Internet Explorer®, Google® Chrome®, Apple® Safari®, Rockmelt®, and so forth. In such cases, the data report request 110 may be sent via a web browser-supported communications protocol, such as the Hypertext Transfer Protocol (HTTP), the HTTP Secure (HTTPS), the File Transfer Protocol (FTP), and so forth.

The data report request 110, including the syntax tree, may be provided to a query compiler module 112. The query compiler module 112 may traverse the syntax tree of the data report request 110, and for each requested data attribute in the syntax tree, determine a datastore from which to retrieve data for the data attribute. In some implementations, this determination may be based on storage metadata 114 that describes which datastores store data for which data attributes. The storage metadata may also include other information, including information regarding query languages supported by one or more datastores, and data quality information. In some implementations, the storage metadata 114 is provided by a storage metadata module 116. The storage metadata 114 is described further with reference to FIG. 6.

In some implementations, the query compiler module 112 may also employ heuristics data to generate the query plan 118. As used herein, heuristics data may describe any data that is employable by implementations to predict, measure, or otherwise determine the performance or behavior of one or more datastores. In some implementations, the heuristics data may include data retrieval latency information, or other information that enables a prediction of a latency or delay to retrieve data from at least one of the datastores. Based on such heuristic information, implementations may determine the particular datastore from which to retrieve the requested data attribute based on which datastore has the lowest data retrieval latency, or is otherwise optimal. The heuristics data may be stored on the report processing server device(s) 106 or externally. In some implementations, the heuristics data may be included in the storage metadata 114.

For each requested data attribute in the syntax tree of the data report request 110, the query compiler module 112 may determine a datastore from which to retrieve data for the requested data attribute, and generate at least one query to retrieve the data. The at least one query may also include the requested conditions and ordering, may be generated in a query language that is supported by the datastore as indicated by the storage metadata 114. The one or more queries generated to retrieve data requested in the data report request 110 may be included in a query plan 118, which is executed by a query execution module 120. Operations to generate and execute the query plan 118 are described further with reference to FIGS. 7-10.

The query execution module 120 may execute one or more queries of the query plan 118 to retrieve data from datastore(s) in one or more data warehouse(s) 122, and receive the result(s) of the query plan execution 124. In some implementations, the query execution module 120 may measure a latency in executing the one or more queries of the query plan 118, and update the heuristics data based on the measured latency information.

The data warehouse(s) 122 may include one or more datastores. The datastores in the data warehouse(s) 122 may include any number of databases, data storage nodes, or other data storage devices. In some cases, the datastores may include one or more processors or computing devices to perform actions for data storage, retrieval, and modification. Alternatively, the datastores may be controlled by processors or computing devices not included in the data warehouse(s) 122. The datastores in the data warehouse(s) 122 may store any amount of structured or unstructured data. In some cases, the amount of data stored in the data warehouse(s) 122 may be on the order of exabytes.

The data warehouse(s) 122 may include any number of relational datastore(s) 126. As used herein, a relational datastore describes a datastore that employs a relational storage format including one or more formally described tables, each table including one or more columns associated with data attributes. The relational datastore(s) 126 may be managed through RDBMS software. The relational datastore(s) 126 may include any number of relational databases, including, but not limited to, databases managed through any of the following: Oracle® and MySQL®, from Oracle Corporation of Redwood City, Calif.; DB2®, from International Business Machines (IBM) Corporation of Armonk, N.Y.; Linter®, from the RELEX Group of Voronezh, Russia; Microsoft Access® and Microsoft SQL Server®, from Microsoft Corporation of Redmond, Wash.; PostgreSQL®, from the PostgreSQL Global Development Group; and SQLite®, from D. Richard Hipp.

The data warehouse(s) 122 may also include any number of non-relational datastore(s) 128 that employ a non-relational data storage format and that may not comply with a relational database model. In some cases, the non-relational datastore(s) 128 may employ a hierarchical database model, or a network database model. The non-relational datastore(s) 128 may also include key-value datastores, hash tables, flat files, associative arrays, other types of data structures, or unstructured data storage. In some cases, the non-relational datastore(s) 128 may store metadata describing data attributes or other aspects of the stored data. The non-relational datastore(s) 128 may include any number of non-relational databases, including but not limited to databases managed through any of the following: FoxPro® database management system, from Microsoft Corporation of Redmond, Wash.; ParAccel® Analytic Database, from ParAccel, Incorporated of San Diego, Calif.; and Hadoop®, from the Apache Software Foundation.

In some implementations, the data warehouse(s) 122 may include pre-processed or cached data 130, storing results generated through previously executed queries. The pre-processed or cached data 130 may be accessed in cases where the query plan 118 includes one or more queries that are the same or substantially similar to previously executed queries that generated the pre-processed or cached data 130. Accessing the pre-processed or cached data 130, instead of re-executing the queries, may lower the data retrieval latency for executing the query plan 118 and provide for more efficient data retrieval. In some implementations, the pre-processed or cached data 130 may be stored in memory on the report processing server device(s) 106 or on one or more other devices, instead of, or in addition to, being included in the data warehouse(s) 122.

The various relational datastore(s) 126 and non-relational datastore(s) 128 of the data warehouse(s) 122 may each support one or more native query languages for performing data read and write operations. For example, the relational datastore(s) 126 may support a version of the Structured Query Language (SQL). As another example, the non-relational datastore(s) 128 that implement the Hadoop® framework may support queries in the Hadoop Query Language (HQL) or MapReduce. Information describing the relational datastore(s) 126 and non-relational datastore(s) 128 may be included in the storage metadata 114, as described further with reference to FIG. 6.

Based on the result(s) of the query plan execution 124, the query execution module 120 or another module of the report processing server device(s) 106 may generate one or more data reports 132. As used herein, a data report describes a collection of at least a portion of the data retrieved from the data warehouse(s) 122 and delivered to a data consuming user or process via any method. The data report(s) 132 may include the data from the result(s) of the query plan execution 124. The data report(s) 132 may be in any format, and in some cases may include unformatted query result data. The data report(s) 132 may be delivered to the user device(s) 104 for access by a data consumer 102. In some cases, the data report(s) 132 may be accessed by a data consumer 102 that is a separate entity from the user(s) who submitted the data report request 110, such that the result data is delivered to a different individual or set of individuals from the person who requested the report. In some cases, the data report(s) 132 may be provided to the user who requested the report.

In some cases, the data report request 110 may be for a single data report 132, such that the query plan 118 is executed once to generate the data report 132. Alternatively, the data report request 110 may be for a data report 132 to be generated periodically (e.g., nightly, weekly, monthly, and so forth). In such cases, the data report request 110 may include a request of a frequency, schedule, or other time parameters for generation of the requested data report 132, and the query plan 118 may be executed at time(s) corresponding to the requested time parameters.

In some implementations, the data report request(s) 110, and the user interface through which they are generated, are not tied to any particular data storage technology or native query language. Accordingly, implementations enable the data consumer(s) 102 or other users to access the large quantities of heterogeneously stored data in the data warehouse(s) 122 without requiring the users to have any particular knowledge of the native query languages or the underlying structure of the datastores in the data warehouse(s) 122.

In some implementations, the environment 100 may include one or more cache server devices 134 that cache or otherwise store the results of previous query executions. In such implementations, the query execution module 120 may provide the query plan 118, or one or more queries of the query plan 118, to the cache server device(s) 134 instead of or in addition to executing the queries. If the cache server device(s) 134 store previous results of previous executions of the one or more queries of the query plan 118, the cache server device(s) 134 may provide cached results 136 to the query execution module 120. The query execution module 120 may then generate the data report(s) 132 based on the cached results 136 in addition to or instead of the result(s) of query plan execution 124.

Implementations support storage of the cached results 136 on the cache server device(s) 134, on the data warehouse(s) 122 (e.g., as the pre-processed or cached data 130), on the report processing server device(s) 106, or on any combination of these devices. By employing the cached results 136, implementations may enable the data report(s) 132 to be generated and provided to the data consumer(s) 102 with less delay or greater efficiency than if the one or more queries of the query plan 118 were executed to retrieve the requested data from the data warehouse(s) 122.

In some implementations, the various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), and mobile communications networks (e.g. 3G, 4G, and so forth).

Figure 2:
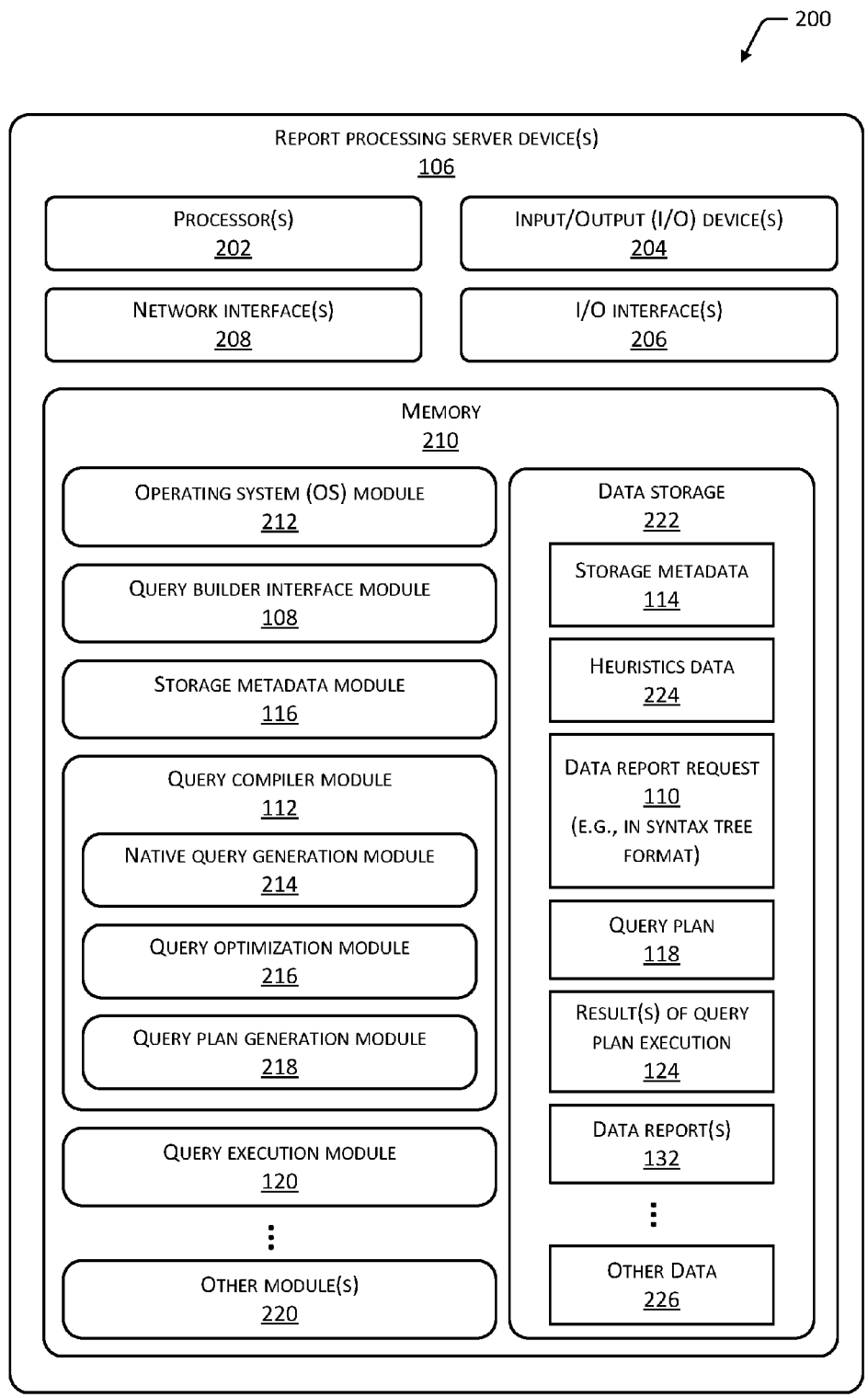
FIG. 2 depicts a block diagram of a report processing server device configured to perform operations for receiving a data report request, determining a query plan based on the request, executing the query plan, and sending a report including the results of the query plan execution.

FIG. 2 depicts a block diagram 200 of the report processing server device(s) configured to perform operations for receiving the data report request 110, determining the query plan 118 based on the request, executing the query plan 118, and providing the data report 132 including the results of the query plan execution 124. The report processing server device(s) 106 may include one or more processors 202 configured to execute one or more stored instructions. The processor(s) 202 may comprise one or more cores.

The report processing server device(s) 106 may include one or more input/output (I/O) devices 204. The I/O device(s) 204 may include user input devices such as a keyboard, a mouse, a pen, a game controller, a voice input device, a touch input device, a gestural input device, a haptic input device, or other devices. The I/O device(s) 204 may also include output devices such as a display, a printer, audio speakers, haptic output devices, and so forth. The I/O device(s) 204 may be physically incorporated with the report processing server device(s) 106, or may be externally placed.

The report processing server device(s) 106 may include one or more I/O interfaces 206 to enable components of the report processing server device(s) 106 to control, interface with, or otherwise communicate with the I/O device(s) 204. The I/O interface(s) 206 may enable information to be transferred in or out of the report processing server device(s) 106, or between components of the report processing server device(s) 106, through serial communication, parallel communication, or other types of communication. For example, the I/O interface(s) 206 may comply with the RS-232 standard for serial ports, or with the Institute of Electrical and Electronics Engineers (IEEE) 1284 standard for parallel ports. As another example, the I/O interface(s) 206 may be configured to provide a Universal Serial Bus (USB) connection. The report processing server device(s) 106 may also include one or more busses or other internal communications hardware or software that allow for the transfer of data between the various modules and components of the report processing server device(s) 106.

The report processing server device(s) 106 may include one or more network interfaces 208 to enable communications between the report processing server device(s) 106 and other networked devices, such as the user device(s) 104 or the data warehouse(s) 122. The network interface(s) 208 may include one or more network interface controllers (NICs) or other types of transceiver devices configured to send and receive communications over a network.

The report processing server device(s) 106 may include one or more memories, described herein as memory 210. The memory 210 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 210 provides storage of computer-readable instructions, data structures, program modules, and other data for the operation of the report processing server device(s) 106.

The memory 210 may include an operating system (OS) module 212. The OS module 212 is configured to manage hardware resources such as the I/O device(s) 204, the I/O interface(s) 206, and the network interface(s) 208, and to provide various services to applications, processes, or modules executing on the processor(s) 202. The OS module 212 may include one or more of the following: any version of the Linux® operating system originally released by Linus Torvalds; any version of iOS® from Apple Corp. of Cupertino, Calif.; any version of Windows® or Windows Mobile® from Microsoft Corp. of Redmond, Wash.; any version of Android® from Google, Corp. of Mountain View, Calif. and its derivatives from various sources; any version of Palm OS® from Palm Computing, Inc. of Sunnyvale, Calif. and its derivatives from various sources; any version of BlackBerry OS® from Research In Motion Ltd. of Waterloo, Ontario, Canada; any version of VxWorks® from Wind River Systems of Alameda, Calif.; or other operating systems.

In some implementations, the memory 210 includes the query builder interface module 108. The query builder interface module 108 may provide a user interface that is accessible to the user device(s) 104, enabling the data consumer(s) 102 or other users to generate the data report request 110. The user interface provided by the query builder interface module 108 is described further with reference to FIG. 3. In cases where the user interface is provided through one or more web pages, the query builder interface module 108 may include a web server such as the Apache Web Server®, from the Apache Software Foundation, Internet Information Services® (IIS), from the Microsoft Corporation of Redmond, Wash., or another web server.

The memory 210 may include the storage metadata module 116, which provides the storage metadata 114 describing the datastores in the data warehouse(s) 122. The storage metadata 114 and storage metadata module 116 are described further with reference to FIG. 6.

The memory 210 may also include the query compiler module 112, which generates the query plan 118 based on the data report request 110 and the storage metadata 114. Operations of the query compiler module 112 are described further with reference to FIGS. 7-10. In some implementations, the query compiler module 112 includes a native query generation module 214 which generates one or more queries of the query plan 118. The native query generation module 214 may generate each query in a native query language supported by the particular datastore storing data to be retrieved using the query. The native query generation module 214 may access the storage metadata 114 to determine the native query language supported by a datastore. For example, a query to retrieve data from one of the relational datastore(s) 126 may be generated in a version of SQL. As another example, a query to retrieve data from one of the non-relational datastore(s) 128 may be generated in HQL or MapReduce.

The query compiler module 112 may also include a query optimization module 216, which may optimize one or more queries of the query plan 118 to reduce data retrieval latency. For example, in cases where the query plan 118 includes two or more queries for data in a particular datastore, the query optimization module 216 may combine the two or more queries into a single query for more efficient execution.

The query compiler module 112 may also include a query plan generation module 218, which adds each generated query to the query plan 118, and stores the query plan 118.

The memory 210 may include the query execution module 120, which executes the one or more queries of the query plan 118, receives the data result(s) of the query plan execution 124, and generates the data report(s) 132 based on the retrieved data. The memory 210 may also include one or more other modules 220, such as a user authentication module, an access control module, and so forth.

The memory 210 may also include data storage 222 to store information for operations of the report processing server device(s) 106. The data storage 222 may comprise a database, array, structured list, tree, or other data structure. The data storage 222 may include the storage metadata 114, including information describing the various datastores of the data warehouse(s) 122. The storage metadata 114 is described further herein with reference to FIG. 6.

In some implementations, the data storage 222 may include heuristics data 224, enabling the query compiler module 112 or other modules to predict the performance of one or more datastores. In some implementations, the heuristics data 224 includes data retrieval latency information, indicating an estimated, predicted, or previously measured time delay for retrieving data from one or more datastores. The data retrieval latency information may indicate a time delay for retrieving one or more particular data attributes from the datastore, or may indicate a time delay for retrieving any data from the datastore. The heuristics data 224 may also include other types of information for predicting the behavior of one or more datastores.

In some implementations, the query execution module 120 may measure the latency in executing a query to retrieve data from a datastore. The query execution module 120 may then provide that latency information to update the heuristics data 224, thus enabling a prediction of the data retrieval latency for retrieving data from the datastore during subsequent query executions.

The data storage 222 may include the data report request 110 received from a user, the query plan 118, the result(s) of the query plan execution 124, and the one or more generated data reports 132. The data storage 222 may also store other data 226, such as user account information, user authentication information, and so forth. In some implementations, at least a portion of the information stored in the data storage 222 may be stored externally to the report processing server device(s) 106, on other devices that are accessible to the report processing server device(s) 106 over a network.

Figure 3:
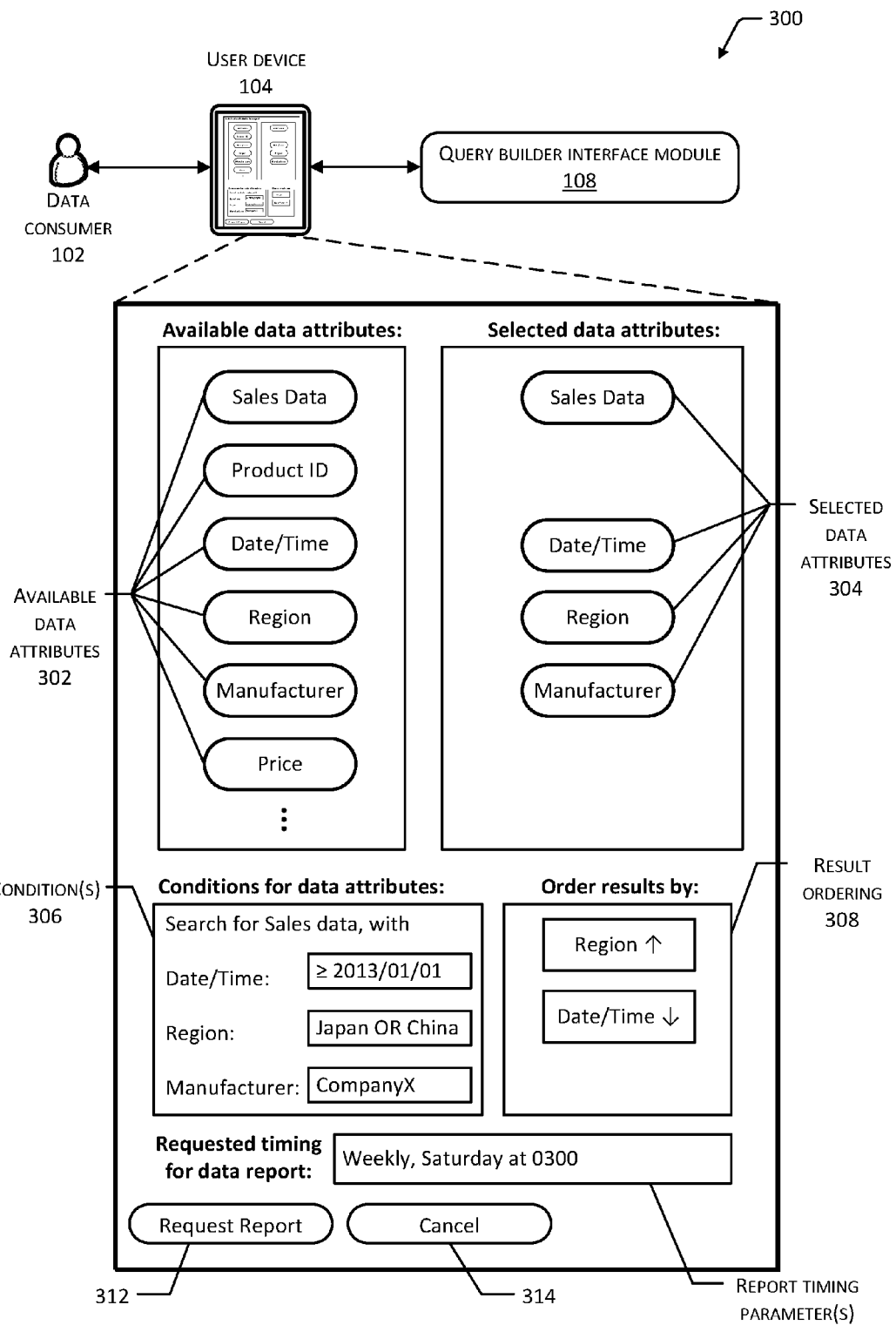
FIG. 3 depicts an example user interface to enable a user to request a data report.

FIG. 3 depicts an example user interface 300 to enable the data consumer(s) 102 or other user(s) to request the data report 132. In some implementations, the user interface 300 may be generated and provided by the query builder interface module 108. The user interface 300 may be provided through a web site accessed by a web browser executing on the user device 104. Alternatively, the user interface 300 may be provided by another application executing on the user device 104.

In some implementations, a data consumer 102 or another user of the user device 104 may be identified or authenticated to the user interface 300, such as through a login, password, identification number, security certification, public or private encryption keys, and so forth. The user may then be presented with available data attributes 302 that the user may select for the data report 132. The available data attributes 302 may include those types, categories, or elements of data stored in the various datastores of the data warehouse(s) 122. For example, for data stored in one of the relational datastore(s) 126, the available data attributes 302 may include identifiers for the columns included in one or more tables of the relational datastore 126. In some cases, the available data attributes 302 may be determined based on the storage metadata 114 indicating which datastores store data for which data attributes.

In some cases, similar or same data may be stored in multiple datastores, with a different data attribute name or identifier in each of the multiple datastores. For example, product identification information may be stored in datastore A under the data attribute "ProductID" and in datastore B under the data attribute "ProductIdentifier." In such cases, the different data attribute identifiers may be normalized to a common data attribute identifier prior to display in the user interface 300.

The user interface 300 may enable the user to select one or more of the available data attributes 302 for generating the data report 132. The selected data attributes 304 may be displayed in a separate frame, dialog, or section of the user interface 300, from the available data attributes 302, or may be indicated through a color, shape, or other visually perceivable alteration of the available data attributes 302. In the example of FIG. 3, the user interface 300 includes a control enabling the user to select one or more of the available data attributes 302 by dragging and dropping them from a first section of the interface into a second section. Implementations may employ other mechanisms for selecting from the available data attributes 302.

The user interface 300 may also enable a user to specify one or more conditions 306 to be applied to the selected data attribute(s) 304. The condition(s) 306 may indicate that data of a specified value, within a specified set of values, or within a specified range of values is to be retrieved from the datastore(s) to generate the data report 132. For example, as shown in FIG. 3, a user has indicated a selected data attribute 304 for "date/time", and specified a condition 306 that date/time is equal to or later than Jan. 1, 2013. The user has also indicated a selected data attribute 304 for "region", and specified a condition 306 that the region is equal to Japan or China. The user has indicated a selected data attribute 304 for "manufacturer", and specified a condition 306 that the manufacturer is CompanyX. Implementations support data attributes of any data type, including numeric types, textual types, Boolean types, and so forth. Implementations support condition(s) 306 that include any number of conditions and Boolean operators such as AND, OR, NOT, XOR, and so forth.

Implementations may also enable a user to enter other types of functional operators, including, but not limited to, the following: SUM, to provide a sum of retrieved data; COUNT, to provide a count of retrieved rows; MIN, to provide a minimum value within retrieved data; MAX, to provide a maximum value within retrieved data; and AVERAGE, to provide an average value within retrieved data. Implementations may also support workflow-type or set-type operators such as de-dupe, union, intersect, minus, and so forth.

In some implementations, the user interface 300 includes elements to enable a user to specify a result ordering 308 for the data included in the data report 132. For example, as shown in FIG. 3, the user has requested that the data report 132 is to include data sorted by region in ascending order, and by data/time in descending order. Implementations support any number of requests for results sorting or ordering based on any number of data attributes.

The user interface 300 may also enable a user to enter report timing parameters 310, requesting one or more times when the data report 132 is to be generated and provided. The report timing parameters 310 enable a user to request that the data report 132 be generated and provided once at a particular date and time, at multiple dates/times, with a specified frequency (e.g., daily, weekly, monthly, yearly, etc.), on a particular day and time, and so forth. In the example shown in FIG. 3, the user has requested the report be generated weekly, on Saturday at 0300.

The user interface 300 may also include a control 312 to request the data report 132 based on the information entered by the user in the user interface 300, and a control 314 to cancel or clear the information entered. On selecting the control 312, the data report request 110 may be generated. In some implementations, selecting the control 312 may also initiate a generation of the syntax tree to be included in the data report request 110. Selecting the control 312 may cause the data report request 110 to be sent to the report processing server device(s) 106. Although the controls 312 and 314 are shown as buttons in the example user interface 300, implementations may employ any type of user interface element.

Although FIG. 3 shows an example user interface 300 with various user interface elements in particular positions, the particular arrangement shown is not in any way limiting of implementations. Implementations may employ a user interface that includes more or fewer user interface elements or controls or different types of user interface elements or controls, in any combination and in any arrangement to enable functionality of the implementations. Further, implementations may support multiple user interfaces (e.g., multi-page web sites) with functionality that is spread across various dialogs, windows, frames, or pages. Implementations may also support dynamically generated interfaces, where the particular user interface elements displayed and the location or duration of their display is based on a particular state of the system, characteristics of the user device 104 or its user, or other factors. Moreover, although the example user interface 300 is presented as a visual display, the user interface 300 may employ other means for presenting data such as audio or haptic effects.

Figure 4:
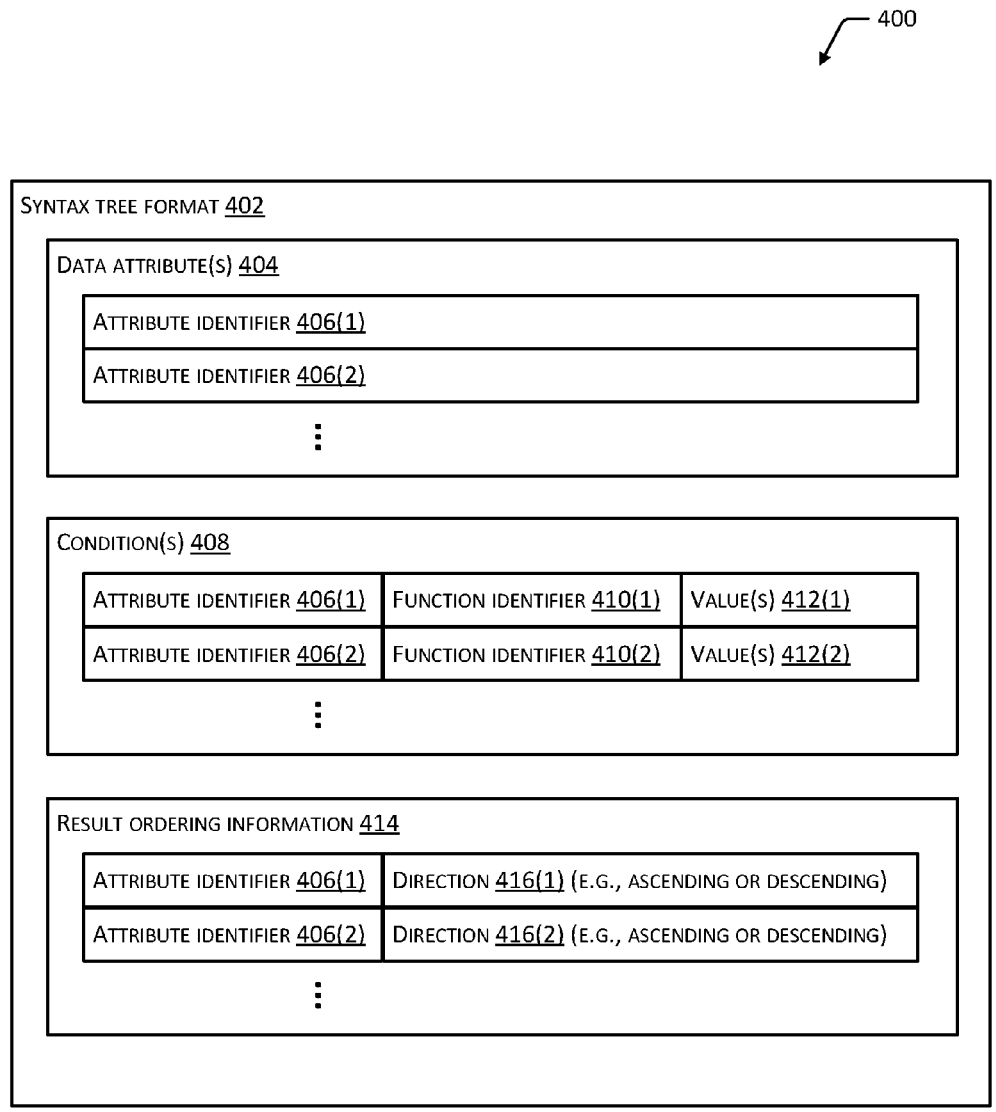
FIG. 4 depicts a schematic of an example syntax tree format that may be employed in the data report request.

FIG. 4 depicts a schematic 400 of a syntax tree format 402 that may be included in the data report request 110. In some implementations, at least a portion of the data report request 110 may comply with the syntax tree format 402. In some cases, the data report request 110 may also include data that is not in the syntax tree format 402. The syntax tree format 402 may be an abstract syntax tree that is abstracted away from (e.g., not tied to) any particular data storage format, data storage technology, or native query language of the datastore(s) in the data warehouse(s) 122.

The syntax tree format 402 may include one or more data attributes 404, each identified by an attribute identifier 406. As described above, the attribute identifier 406 may be normalized to provide a consistent attribute identifier 406 across multiple datastores that may employ different identifiers to describe similar data.

The syntax tree format 402 may also include a section describing one or more condition(s) 408 on the data attribute(s) 404. The condition(s) 408 may indicate that data for the data attribute(s) 404 is to be retrieved based on whether it satisfies the condition(s) 408. Accordingly, each of the condition(s) 408 may include an attribute identifier 406, a function identifier 410, and one or more values 412 indicating a value, set of values, or range of values for the data attribute 404 identified by the attribute identifier 406.

The syntax tree format 402 may also include a section describing result ordering information 414 for the data report 132. The result ordering information 414 may include zero or more ordering requests. Each ordering request may include an attribute identifier 406 which data attribute 404 to sort on, and a direction 416 indicating whether the sorting is to be ascending or descending based on the identified data attribute 404.

The data attribute(s) 404, the condition(s) 408, and the result ordering information 414 may each be arranged hierarchically with parent-to-child relationships between elements. Sample 1 below provides an example of the syntax tree format 402 that may be employed in implementations.

Sample 1

```
{
"name" : "ReportName",
"properties":
    "attributes" : {
        "type": "array",
        "items" : {
            "type" : "object",
            "properties" : {
                "id" : {
                    "type" : "number",
                    "minimum" : 0,
                    "required" : true
                },
                "aggregateFunctionId" : {
                    "type" : "number",
                    "minimum" : 0,
                }
            }
        },
        "required" : true
    },
    "conditions" : {
        "type" : "object",
        "properties": {
            "functionId" : {
                "type" : "number",
                "minimum" : 0,
                "required" : true
            },
            "children" : {
                "type" : "array",
```

-continued

```
                "items" : {
                    "type" : "object" {
                    "properties" : {
                        "attributeId" : {
                            "type" : "number",
                            "minimum" : 0,
                            "required" : true
                        },
                        "functionId" : {
                            "type" : "number",
                            "minimum" : 0,
                            "required" : true
                        },
                        "values" : {
                            "type" : "array",
                            "items" : {
                                "type" : "string"
                            },
                            "required" : true
                        }
                    }
                }
            }
            "required" : true
        }
        "required" : false
    }
    },
    "ordering" : {
        "type" : "array",
        "items" : {
            "type" : "object",
            "properties" : {
                "attributeId" : {
                    "type" : "number",
                    "minimum" : 0,
                    "required" : true
                },
                "ascending" : {
                    "type" : "boolean",
                    "required" : true
                }
            }
        }
    }
}
```

Sample 1 provides an example of the syntax tree format 402 having a particular syntax, grammar, and set of supported tokens such as "name," "conditions," "type," "properties," "children," curly braces, and so forth. Implementations are not limited to the syntax, grammar, and tokens included in this example. Further, although the examples described herein include data report requests 110 that incorporate, at least in part, the syntax tree format 402, implementations are not limited to using the syntax tree format 402. Accordingly, implementations may employ other data formats or structures, or unstructured data, in the data report request(s) 110.

Figure 5:
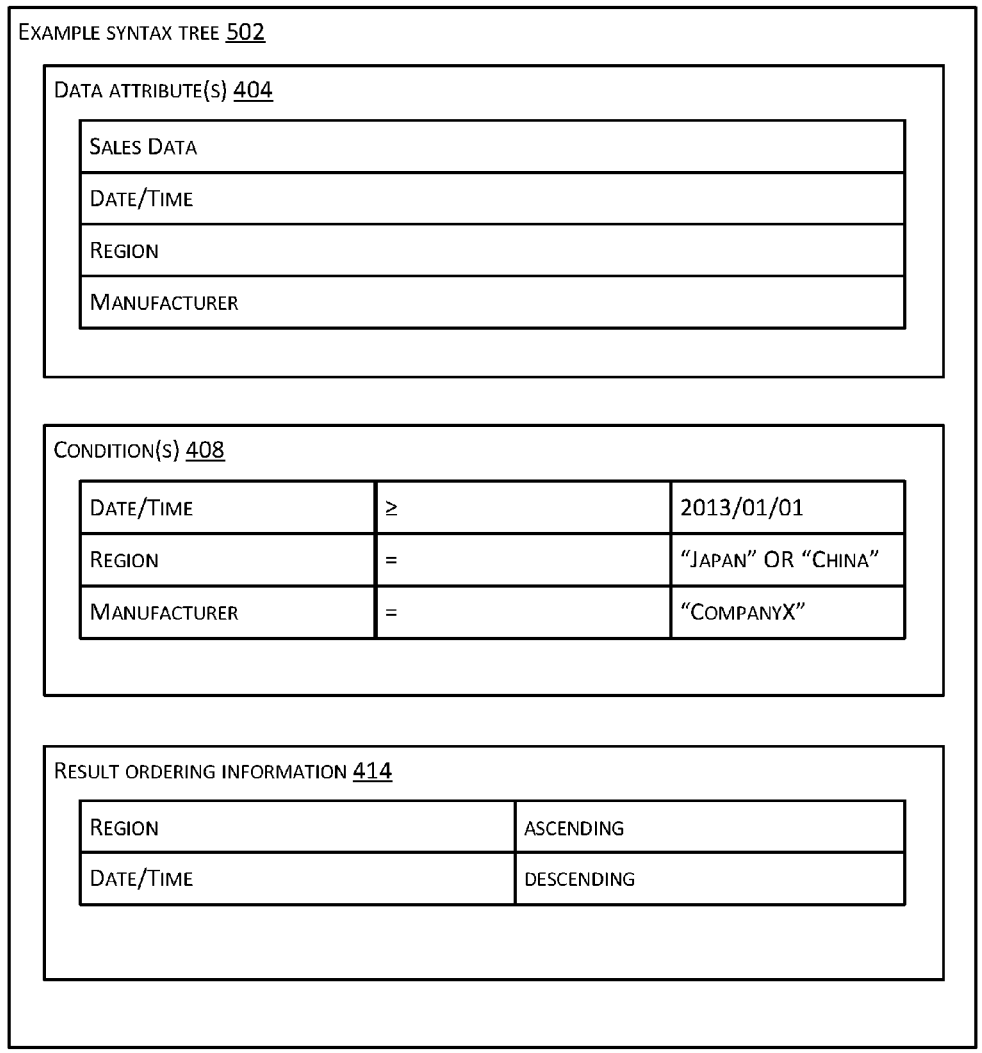
FIG. 5 depicts an example syntax tree for a data report request, expressed in the example syntax tree format of FIG. 4.

FIG. 5 depicts a schematic 500 for an example syntax tree 502 that may be included in the data report request 110, in the syntax tree format 402. The example syntax tree 502 is based on the example request information shown in FIG. 3. In the example syntax tree 502, the section for data attribute(s) 404 includes four attribute identifiers 406 for "Sales Data", "Date/Time", "Region", and "Manufacturer". Accordingly, a user has selected these four data attributes 404 for a data report 132. The example syntax tree 502 further includes condition(s) 408. As in FIG. 3, the user has specified conditions that Date/Time≥2013/01/01, Region="Japan" OR "China", and Manufacturer= "CompanyX". The example syntax tree 502 further includes the requested result ordering information 414, indicating that the results are to be ordered in an ascending direction based on Region, and in a descending direction based on Date/

Time. Sample 2 below provides an example syntax tree corresponding to the arrangement shown in Sample 1.

Sample 2

```
{"reportedAttributes": [
   {"syn":" ",
   "root":{"attributeId":1},
   "aggregateFunction":-1
   },
   {"syn":" ",
   "root":{"attributeId":2},
   "aggregateFunction":-1
   }
],
"conditionsTree": {
"children":
[
    {"children":[{"attributeId":1},{"constant":"7"}],
       "functionId":3}
    {"children":[{"attributeId":2},{"constant":"7"}],
       "functionId":5}
],
"functionId":0
}
}
```

In the example shown in Sample 2, the data report request 110 includes two selected data attributes, with attribute identifiers 1 and 2 respectively. Each of the two selected data attributes has a specified condition. In the first condition, the first attribute (e.g., with identifier 1) is compared to the constant value 7 using function identifier 3 (e.g., a less-than function, or "<"). In the second condition, the second attribute (e.g., with identifier 2) is compared to the constant value 7 using function identifier 5 (e.g., a greater-than function, or ">"). The "functionID" parameter in the "conditionsTree" section may indicate whether the various conditions are to be related based on an AND operator or an OR operator. In this case, "functionID":0 specifies AND. Thus, the two conditions specify that data is retrieved for which attributeID(1)<7 AND attributeID(2)>7.

Figure 6:
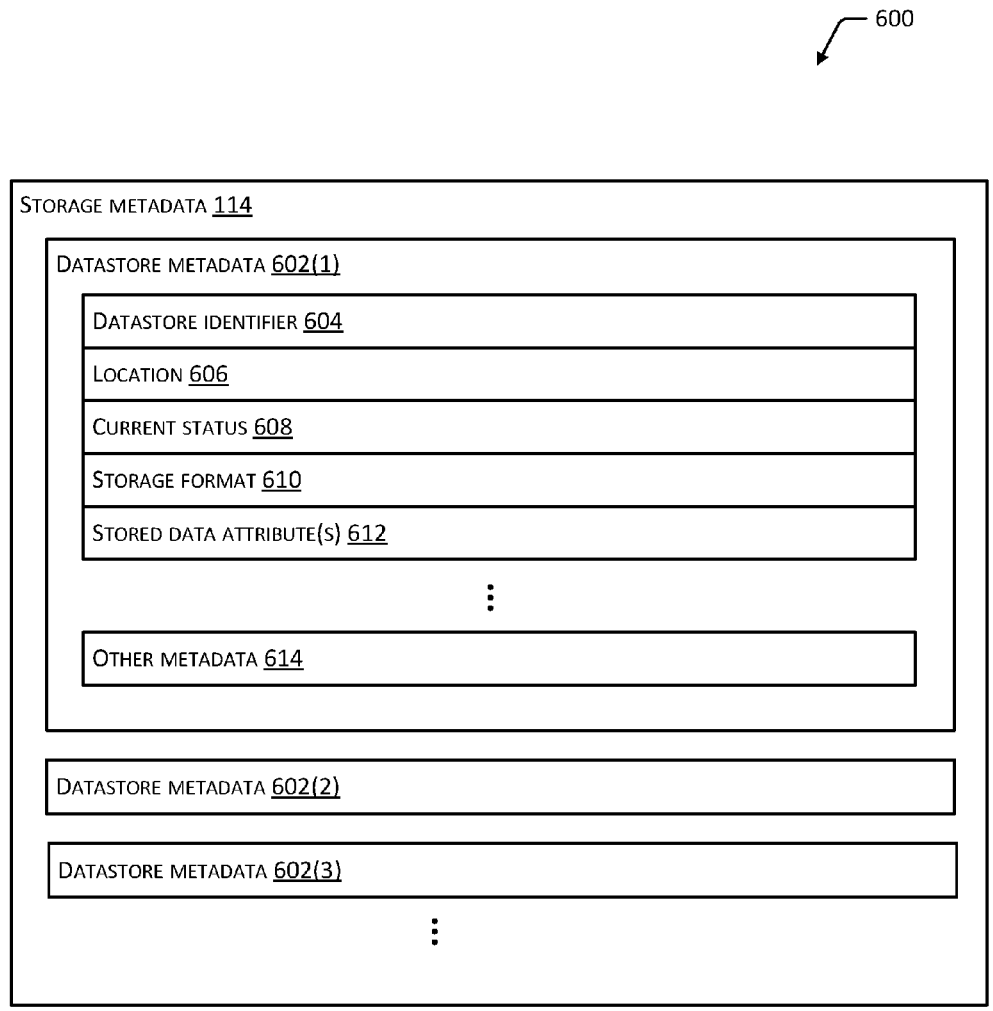
FIG. 6 depicts a schematic of an example data layout for storage metadata describing one or more datastores.

FIG. 6 depicts a schematic 600 of an example data layout for the storage metadata 114. The storage metadata 114 includes information describing one or more datastores of the data warehouse(s) 122. In some implementations, the storage metadata 114 includes one or more sections, and each section includes datastore metadata 602 that describes a particular datastore. Each set of datastore metadata 602 may include a datastore identifier 604 that is a name, address, or other unique identifier for a particular datastore in the data warehouse(s) 122.

In some implementations, the datastore metadata 602 may also include a location 606 indicating a physical location of the datastore. The location 606 may be specific to any degree, and may specify a country, state, province, region, county, prefecture, neighborhood, or street address for the datastore. In some cases, the location 606 may be even more specific, indicating a particular building, floor of a building, room within a building, location within a room, rack within a room, location on a rack, and so forth.

The datastore metadata 602 may include a current status 608 of the datastore, indicating whether the datastore is operational, non-operational, indicating a current load on the datastore, or indicating other operational states.

The datastore metadata 602 may also include a storage format 610 for the datastore. The storage format 610 may indicate a format in which data is stored in the datastore, such as whether the storage format is a relational format or a non-relational format. The storage format 610 may also be somewhat more specific, and may indicate a storage technology, storage model, or storage paradigm for the datastore. For example, the storage format 610 may indicate that the datastore employs a relational database model, a hierarchical database model, a network database model, a key-value data storage model, a hash table, a flat file, an associative array, other types of data structures, or unstructured data storage. The storage format 610 may also indicate a manufacturer or provider of the datastore hardware or the database management system employed by the datastore, including those providers listed above with reference to the relational datastore(s) 126 and the non-relational datastore(s) 128.

The datastore metadata 602 also includes information describing stored data attribute(s) 612. In some implementations, the stored data attribute(s) 612 may be an array or set of bits, where each bit corresponds to a particular data attribute for which data is stored in the data warehouse(s) 122. In such implementations, the value of each bit may indicate whether data for the corresponding data attribute is stored in the datastore described by the datastore metadata 602. For example, if a particular bit is set to a positive, true, or "on" state, that may indicate that data for the corresponding data attribute is stored in the datastore. Alternatively, the stored data attribute(s) 612 may include a listing of those data attributes for which data is stored in the datastore. The datastore metadata 602 may also include other metadata 614, such as the data quality information described below.

The storage metadata 114 may be stored in the memory 210 on the report processing server device(s) 106, or may be stored externally. In some implementations, the storage metadata 114 may be generated or provided by the storage metadata module 116 executing on the report processing server device(s) 106. The storage metadata module 116 may periodically poll the datastores of the data warehouse(s) 122 to determine or update the storage metadata 114. The storage metadata module 116 may also receive information from other modules executing on the report processing server device(s) 106 or elsewhere, and use that information to update the storage metadata 114.

In some implementations, the storage metadata module 116 may be a high performance module executing on the report processing server device(s) 106 to provide the storage metadata 114 with a high availability and low latency to modules such as the query compiler module 112. In some implementations, the storage metadata module 116 may execute on a high-performing computing device that is separate from the report processing server device(s) 106, to provide a high availability of the storage metadata 114.

Figure 7:
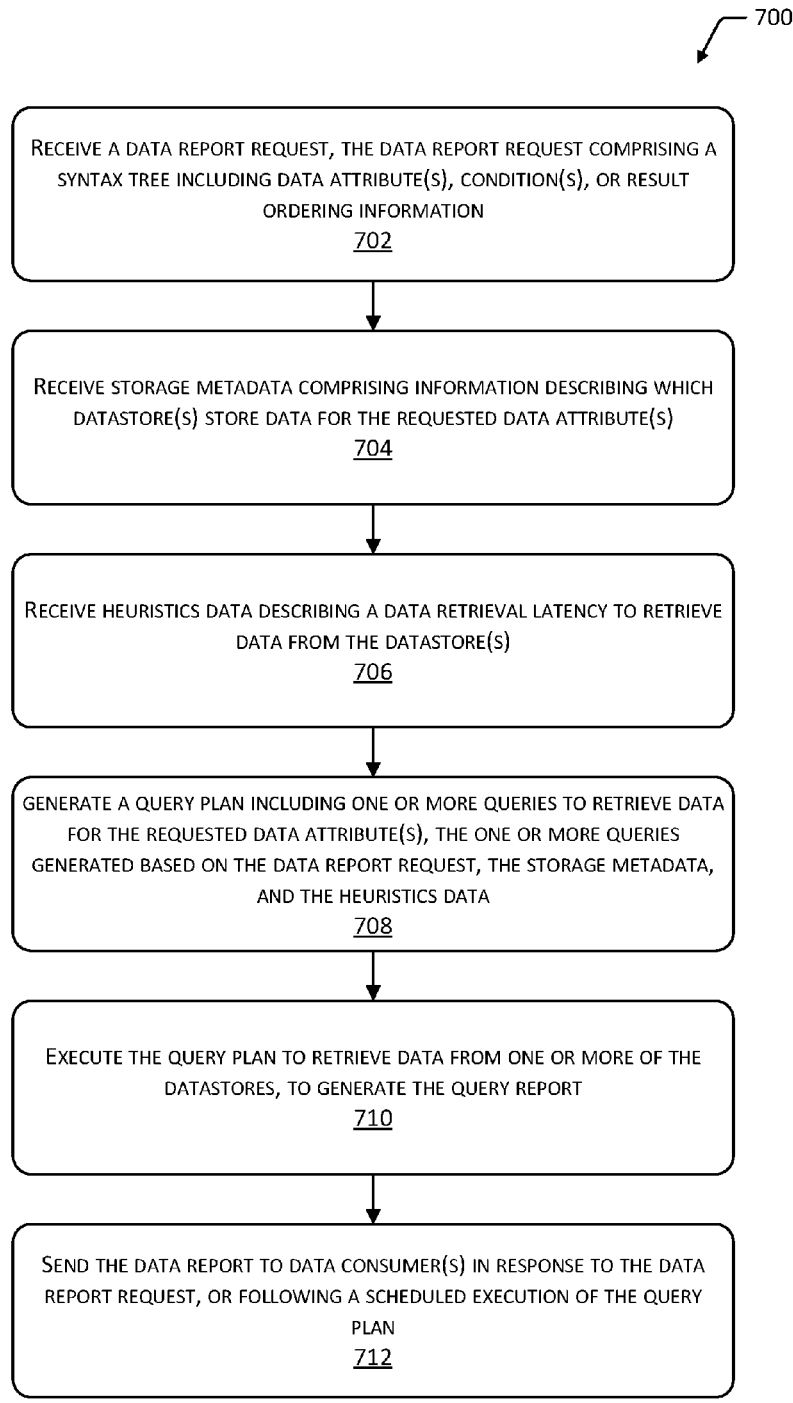
FIG. 7 depicts a flow diagram of a process for generating and executing a query plan to fulfill a data report request, the query plan being generated based at least in part on the storage metadata.

FIG. 7 depicts a flow diagram 700 of a process for generating and executing the query plan 118, to generate the data report 132 and fulfill the data report request 110. Operations included in the process may be performed on one or both of the user device(s) 104 or the report processing server device(s) 106. Operations performed on the report processing server device(s) 106 may be performed by the query compiler module 112, the query execution module 120, or other modules.

At 702, the data report request 110 is received, requesting that the data report 132 be generated. The data report request 110 may specify one or more data attributes for which data is to be retrieved. The data report request 110 may further include one or more conditions on the data attributes, and result ordering information for sorting the data included in the data report 132. In some implementations, the information in the data report request 110 may be in a syntax tree format such as that described with reference to FIGS. 4 and 5. The data report request 110 may also include one or more time parameters requesting a timing or schedule for the generation of the data report 132.

The data report request 110 may be received from the user device(s) 104, based on information entered through the user interface 300 by a user of the user device(s) 104. In some cases, the data report request 110 may be based on information entered by the data consumer 102 who may receive the data report 132. Alternatively, the data report request 110 may be based on information entered by a user other than the one or more data consumers 102 who may receive the data report 132.

At 704, the storage metadata 114 is received. As described above, the storage metadata 114 may describe which datastore(s), if any, store data for the requested data attribute(s) indicated in the data report request 110.

At 706, the heuristics data 224 is received, including the data retrieval latency information for one or more datastores, as described above. In some implementations, the heuristics data 224 may be stored locally on the report processing server device(s) 106, and updated based on the latency of query execution by the query execution module 120. Alternatively, the heuristics data 224 may be stored externally, on one or more devices other than the report processing server device(s) 106.

At 708, the query plan 118 is generated, including one or more queries to retrieve data for the requested data attribute(s) from one or more datastores. The query plan 118 may be generated based at least in part on the data report request 110 and the storage metadata 114. In some implementations, the generation of the query plan 118 may also be based on the heuristics data 224. Generation of the query plan 118 is described further with reference to FIG. 8.

At 710, the query plan 118 is executed to retrieve data from one or more of the datastores of the data warehouse(s) 122. Execution of the query plan 118 may include executing the one or more queries included in the query plan 118. Execution of the one or more queries may be performed serially or in parallel, and may be performed by the query execution module 120. The data resulting from the execution of the one or more queries may be incorporated into the data report 132. The data report 132 may be in any format, and may include data that is structured or unstructured. In some implementations, the data report 132 may include the raw data resulting from execution of the one or more queries of the query plan 118. In some cases, the data report 132 may include the cached results 136 retrieved from the cache server device(s) 134, as described above.

At 712, the data report 132 is sent to one or more data consumers 102. In some cases, the data report 132 may be generated and sent in response to the data report request 110. Alternatively, the data report 132 may be generated and sent at one or more requested times based on the timing parameters specified in the data report request 110. In some implementations, after submitting the data report request 110 the requesting user may be provided with a time estimate for generating the requested data report 132. In such cases, the time estimate may be based on the heuristics data 224 indicating a predicted data retrieval latency for one or more datastores.

Figure 8:
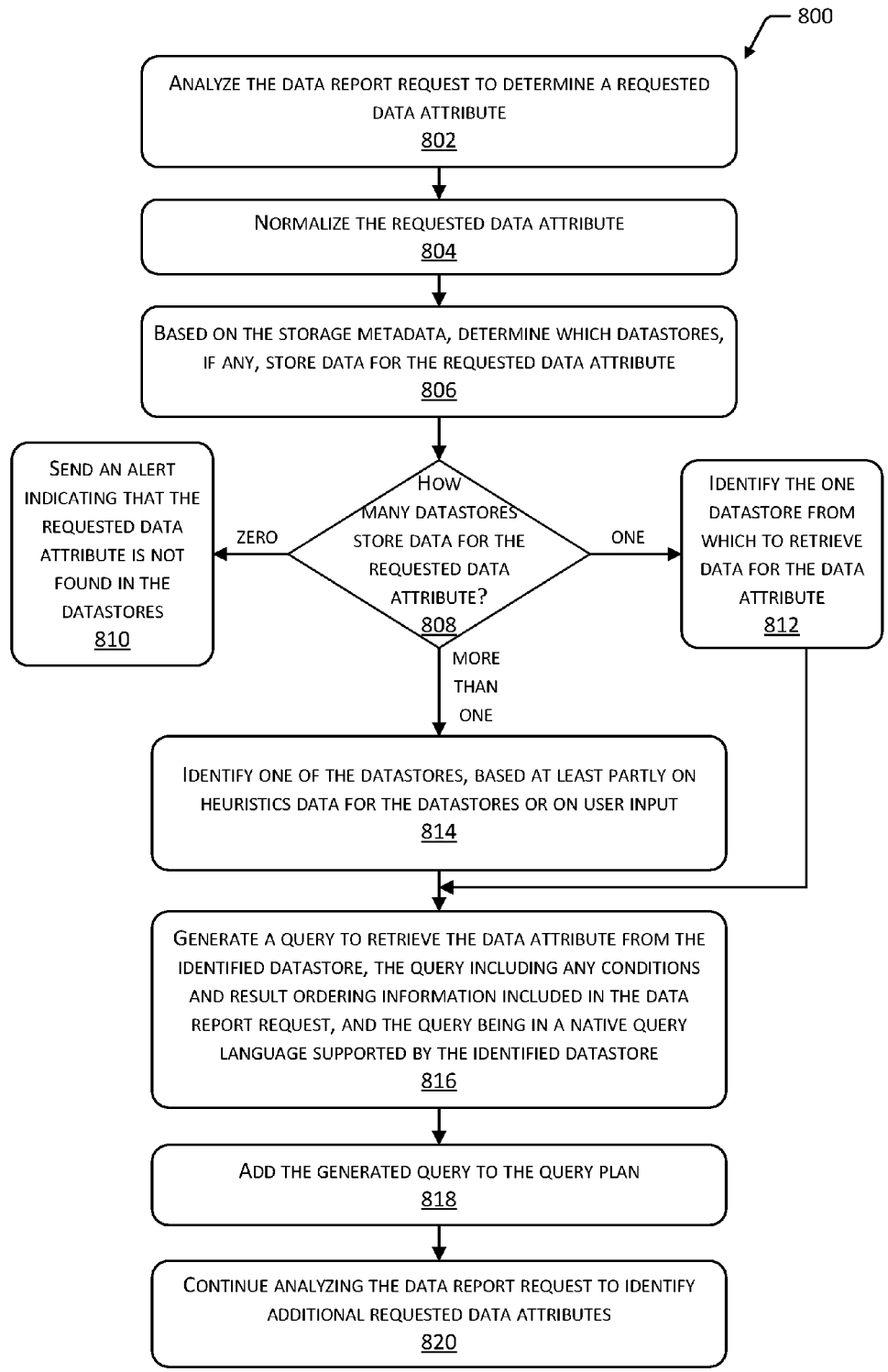
FIG. 8 depicts a flow diagram of a process for generating one or more queries of the query plan, based at least in part on the storage metadata.

FIG. 8 depicts a flow diagram 800 of a process for generating one or more queries of the query plan 118, based at least in part on the storage metadata 114. Operations included in the process may be performed on one or both of the user device(s) 104 and the report processing server device(s) 106. Operations performed on the report processing server device(s) 106 may be performed by the query compiler module 112, the query execution module 120, or other modules.

At 802, the data report request 110 may be analyzed to determine a requested data attribute that is included in the data report request 110. In some implementations, where the data report request 110 is in a syntax tree format, determining a requested data attribute may include traversing or walking the syntax tree to identify each data attribute included in the syntax tree.

At 804, the requested data attribute may be normalized. In some cases, similar data may be stored in different datastores under different data attribute identifiers. In such cases, the attribute identifier for the requested data attribute may be modified to a normalized data attribute identifier that is consistent for all the datastores in the data warehouse(s) 122. In some cases, the data attributes may have been normalized prior to their display as available data attributes 302 in the user interface 300 as described above. In such cases, the data attributes received in the data report request 110 may already be normalized.

At 806, a determination is made of which datastores, if any, store data for the requested data attribute. The determination may be made based on the description of the stored data attributes 612 included in the storage metadata 114. At 808, a decision is made based on the determined number of datastores that store data for the requested data attribute. In cases where the determined number of datastores is zero, the process may proceed to 810 and send an alert or other message to the requesting user indicating that the requested data attribute is not found in the datastores. In cases where the selected data attribute(s) 304 of the user interface 300 are selected from the available data attributes 302, and the available data attributes 302 are displayed based on the data attribute availability information in the storage metadata 114, this output may not occur.

If the determined number of datastores is one, at 812 the one datastore may be identified as the datastore from which to retrieve data for the requested data attribute. The process may then proceed to 816. If the determined number of datastores is more than one, the multiple datastores may be considered candidate datastores. One of the candidate datastores may be selected for data retrieval, based on the heuristics data 224 for the datastores, based on user input, or based on both the heuristics data 224 and user input. The selection of one of the candidate datastores is further described with reference to FIG. 9.

At 816, a query is generated to retrieve the requested data attribute from the datastore identified at 814 or 812. The query may be generated to include any conditions specified by the requesting user in the data report request 110, and may also be generated to provide result data that is sorted according to the result ordering information requested by the user. The query may be generated in a native query language supported by the identified datastore.

At 818, the generated query may be added to the query plan 118. At 820, the process may continue analyzing the data report request 110 to identify any additional requested data attributes in the data report request 110. For each requested data attribute, the process may proceed as described above. In this way, the process may build the query plan 118 including one or more queries to retrieve the one or more requested data attributes. Following the analysis of the data report request 110 and the generation of the query plan 118, the query plan 118 may be executed as described above.

Figure 9:
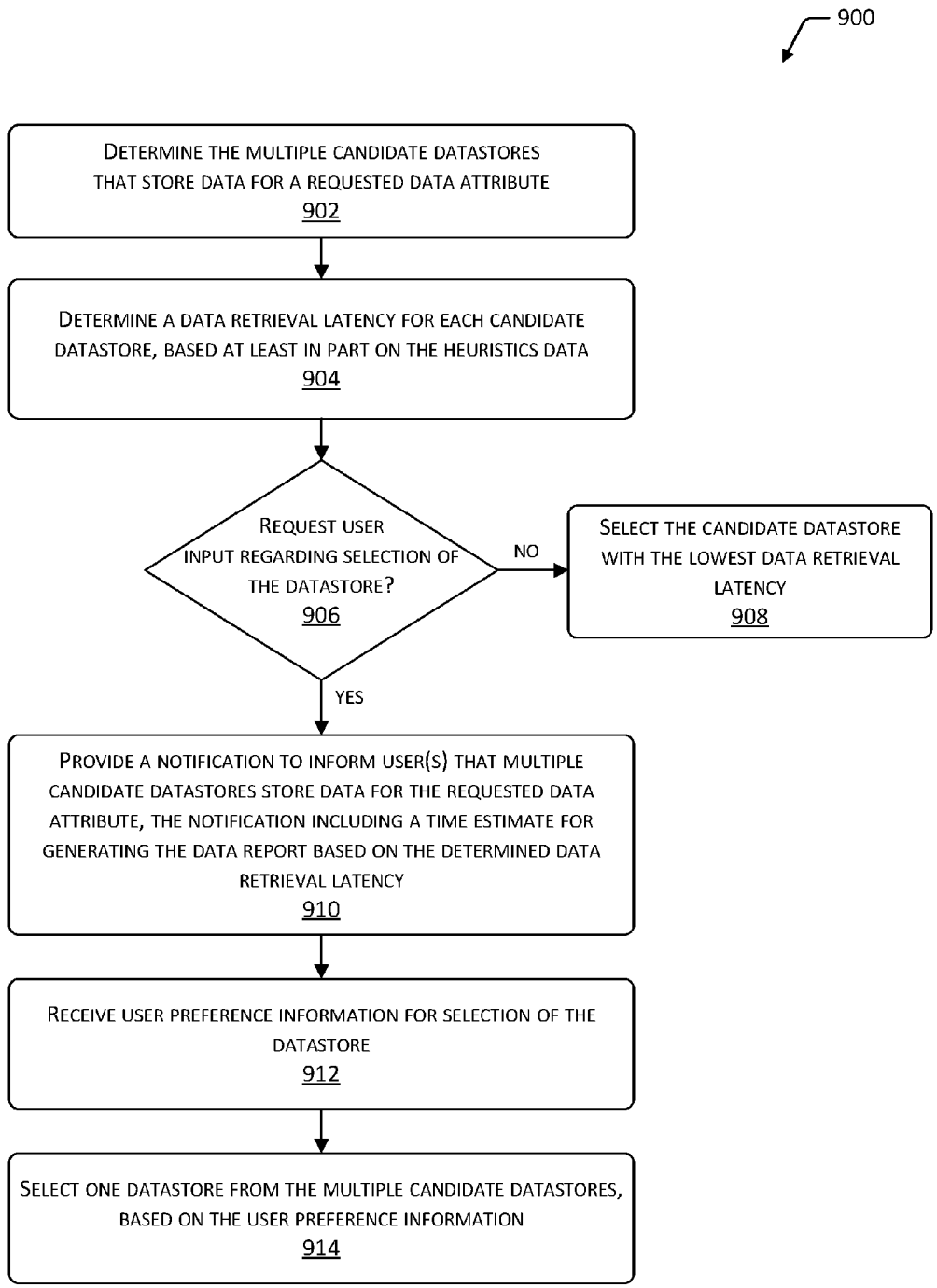
FIG. 9 depicts a flow diagram of a process for determining one or more datastores from which to retrieve data for one or more data attributes requested in the data report request, based on heuristics data, based on user input, or based on both heuristics data and user input.

FIG. 9 depicts a flow diagram 900 of a process for determining one or more datastores from which to retrieve data for one or more data attributes requested in the data report request 110, based on the heuristics data 224 included in the storage metadata 114, based on user input, or based on both the heuristics data 224 and user input. Operations included in the process may be performed on one or both of the user device(s) 104 and the report processing server device(s) 106. Operations performed on the report processing server device(s) 106 may be performed by the query compiler module 112, the query execution module 120, or other modules.

At 902, a determination is made that multiple candidate datastores store data for the requested data attribute. This determination may proceed as described with reference to FIG. 8 above.

At 904, a data retrieval latency is predicted or otherwise determined for each candidate datastore. This determination may be based at least in part on the heuristics data 224 indicating a data retrieval latency for each of the candidate datastores.

At 906, a determination is made whether to request user input regarding the selection of the particular one of the candidate datastores from which to retrieve the requested data. If the determination is negative, at 908 the candidate datastore with the lowest data retrieval latency may be automatically selected.

If the determination at 906 is positive, at 910 at least one user may be provided with a notification that multiple candidate datastores store data for the requested data attribute. The notification may include a request that at least one user provide preference information regarding the selection of a datastore. In some cases, the at least one user may include the requesting user who submitted the data report request 110. The at least one user may also include one or more data consumers 102 who may receive the generated data report 132 and consume the data therein. The notification and user preference request provided at 910 may be provided through the user interface 300, or through a communication such as an email, a text message, a voice message, and so forth.

The notification provided at 910 may include an identification or a description of each of the candidate datastores. The notification provided at 910 may also include a time estimate for generating the data report 132 based on the heuristics data 224 for each of the candidate datastores. In some cases, the user may be provided with information regarding data quality for data stored in each of the candidate datastores. For example, one or more of the candidate datastores may store data that is determined to be older, more corrupt, or that otherwise has a lower data quality than other candidate datastores. The at least one user may be presented with a decision whether they would prefer a faster generation of the data report 132 based on lower quality data, or a slower generation of the data report 132 based on higher quality data. In some implementations, information describing data quality of the candidate datastores may be included in the storage metadata 114.

At 912, user preference information may be received in response to the information sent to the at least one user at 910. At 914, one of the multiple candidate datastores may be selected based on the user preference information.

Figure 10:
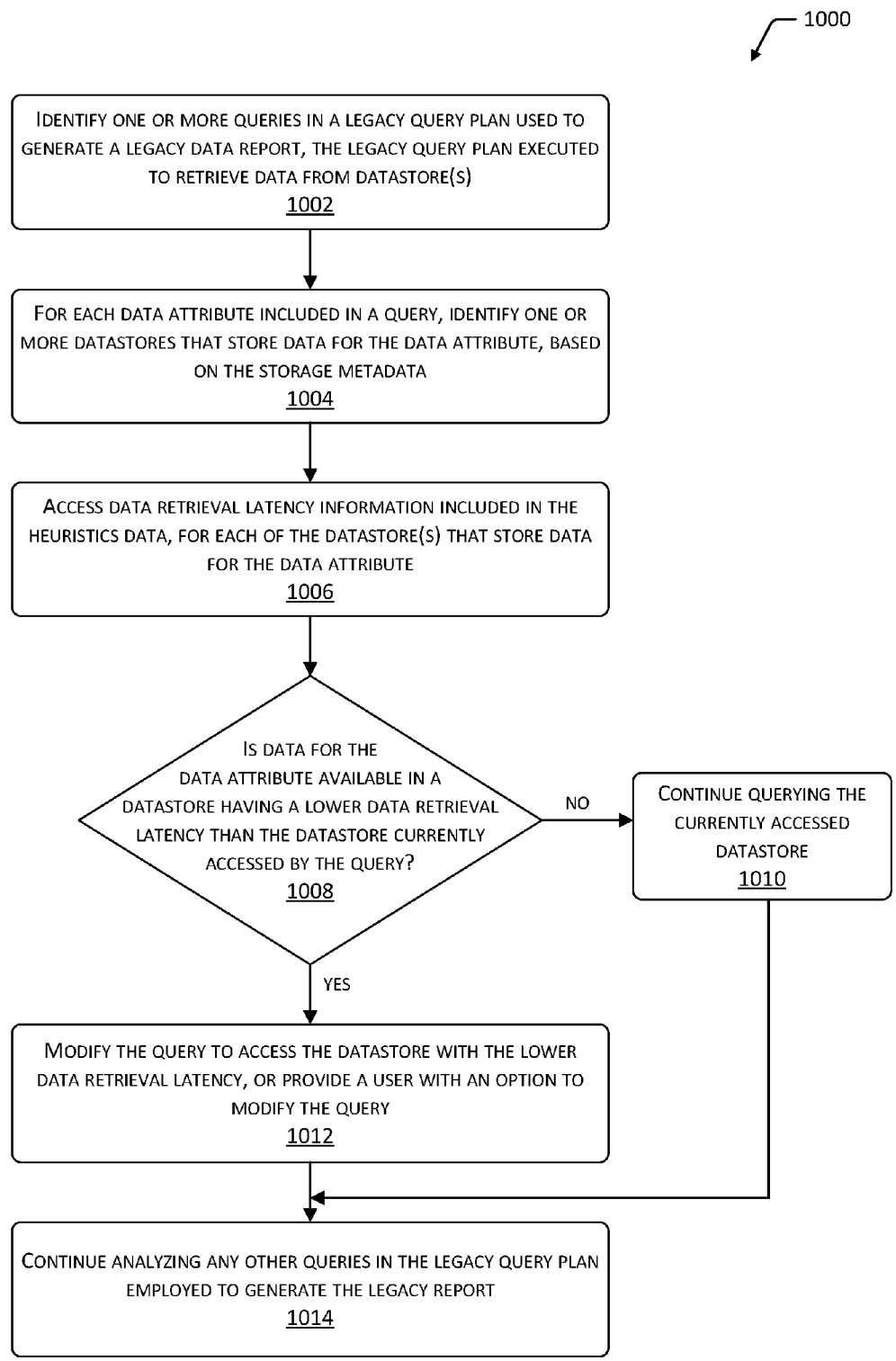
FIG. 10 depicts a flow diagram of a process for analyzing and optimizing a legacy data report based on storage metadata, including the modification of previously executed queries to provide lower latencies in data retrieval.

FIG. 10 depicts a flow diagram 1000 of a process for analyzing and optimizing a legacy data report based at least partly on one or both of the storage metadata 114 and user input. Operations included in the process may be performed on one or both of the user device(s) 104 and the report processing server device(s) 106. Operations performed on the report processing server device(s) 106 may be performed by the query compiler module 112, the query execution module 120, or other modules.

In some cases, one or more legacy data reports may have been generated in the past, based on one or more legacy query plans. Such legacy query plans may have been previously specified (e.g., by data consumers) and may have been scheduled to execute periodically to generate legacy data reports. In the time since the creation of the legacy query plans, the data warehouse(s) 122 may have been modified to add new datastores or to upgrade older datastores to newer, higher performance or lower latency datastores. Accordingly, in some cases a legacy query plan to generate a legacy data report may be executing less efficiently than is possible given a current configuration of the data warehouse(s) 122, and the legacy query plan may be modified to execute more efficiently or with lower latency to generate the legacy data report.

At 1002, one or more queries may be identified in a legacy query plan that is used to generate a legacy data report, the legacy query plan executed to retrieve data from one or more datastores of the data warehouse(s) 122. At 1004, each query of the legacy query plan may be analyzed to identify the data attributes included in the query. For each data attribute included in a query, one or more datastores may be identified that store data for the data attribute. This identification may be based on the storage metadata 114 as described above.

At 1006, the data retrieval latency information included in the heuristics data 224 is accessed for each of the datastores determined to store data for the requested data attribute. At 1008, a determination is made whether the requested data is available in a datastore having a lower data retrieval latency than the datastore currently being accessed by the query of the legacy query plan.

If the determination at 1008 is negative, then at 1010 the query may be left unaltered such that the requested data may continue to be retrieved from the currently accessed datastore. The process may then continue to 1014.

If the determination at 1008 is positive, then at 1012 the query may be modified to access the datastore having the lower data retrieval latency, thus providing a more efficient generation of the legacy data report. In some cases, the modification of the query may include rewriting the query to be in a native query language supported by the lower latency datastore. As an alternative to automatically modifying the query, one or more users may be provided with an option to select whether the query is to be modified based on the lower data retrieval latency. The user(s) may include data consumer(s) 102 of the legacy data report, or one or more other users associated with the legacy data report.

This option may be provided similarly to the user preference request described above with reference to 910. For example, a user may be informed that a lower latency datastore is available to generate the legacy data report, and provided with a choice as to whether the query is to be modified to access the lower latency datastore. In some cases, the user may also be provided with additional information regarding the choice of datastores, such as data quality information, location of the datastore, a data storage format for the datastore, and so forth. In some cases, the user may be informed that the query is to be automatically modified within a certain time period to access the lower latency datastore, providing the user with some forewarning that the query is to be modified. The information provided to user(s) at 1012 may be based at least partly on the storage metadata 114.

At 1014, the process may continue analyzing other queries in the legacy query plan employed to generate the legacy data report, to determine whether other efficiency improvements may be made in the execution of the legacy query plan.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
   receiving a request for a report comprising a syntax tree that includes one or more data attributes identified by an attribute identifier and one or more conditions on the one or more data attributes, the syntax tree comprising a format that is abstracted from a particular one of at least two different storage formats of at least two datastores;
   normalizing the attribute identifiers to generate normalized attribute identifiers for the one or more data attributes to provide a consistent attribute identifier across the at least two datastores;
   receiving storage metadata describing at least one of the at least two datastores storing data for the normalized attribute identifiers, the metadata including a description of the one or more data attributes and data retrieval latency for the at least two datastores;
   providing, to at least one data consumer associated with the report, at least one time estimate for generating the report based on retrieving the data for the one or more data attributes identified by the normalized attribute identifiers from individual ones of the at least two datastores, the at least one time estimate based at least partly on the data retrieval latency for the individual ones of the at least two datastores;
   receiving a selection of a datastore by the at least one data consumer, the selection provided by the at least one data consumer based on the at least one time estimate;
   generating a query plan comprising one or more queries to retrieve data from one or more datastores using the one or more data attributes obtained from the syntax tree of the report identified by the normalized attribute identifiers and the description of the one or more data attributes from the received storage metadata, individual ones of the one or more queries to retrieve at least one of the one or more data attributes from the at least two datastores, the generating of the query plan including modifying the individual ones of the one or more queries to determine a datastore of the at least two datastores based on the selection of the datastore by the at least one data consumer and to access the datastore of the at least two datastores having the determined lower of the data retrieval latency based on the selection of the datastore by the at least one data consumer; and
   executing the modified one or more queries of the query plan to generate the report, the report including data resulting from the executing of the one or more queries.

2. The method of claim 1, wherein the modified one or more queries of the query plan include the one or more conditions on the one or more data attributes.

3. The method of claim 1, wherein the storage metadata further includes information indicative of a storage format supported by at least one of the at least two datastores.

4. The method of claim 1, further comprising:
   presenting, in a user interface, the time estimates for generating the report;
   presenting data quality information in the user interface, the data quality information indicating an age of the data stored in the at least two datastores; and
   wherein the selection of the datastore is based on the time estimates and the data quality information.

5. One or more non-transitory computer-readable media storing instructions which, when executed, instruct at least one processor to perform actions comprising:
   receiving an indication of a report comprising a syntax tree that includes one or more data attributes identified by an attribute identifier and one or more conditions on the one or more data attributes, the syntax tree comprising a format that is abstracted from a particular one of at least two different storage formats of at least two datastores;
   normalizing the attribute identifiers to generate normalized attribute identifiers for the one or more data attributes to provide a consistent attribute identifier across the at least two datastores;
   receiving storage metadata describing at least one of the at least two datastores storing data for the normalized attribute identifiers, the metadata including a description of the one or more data attributes and data retrieval latency for the at least two datastores;
   generating at least one query to retrieve data from one or more datastores using the one or more data attributes from the at least two datastores identified by the normalized attribute identifiers and the description of the one or more data attributes from the received storage metadata;
   providing, to at least one data consumer associated with the report, at least one time estimate for generating the report based on retrieving the data for the one or more data attributes identified by the normalized attribute identifiers from individual ones of the at least two datastores, the at least one time estimate based at least partly on the data retrieval latency for the individual ones of the at least two datastores;
   receiving a selection of a datastore by the at least one data consumer, the selection provided by the at least one data consumer based on the at least one time estimate;
   modifying the at least one query to access the datastore of the at least two datastores based on the selection of the datastore by the at least one data consumer;
   executing the at least one modified query using the storage metadata and the one or more data attributes identified by the normalized attribute identifiers obtained from the syntax tree to retrieve data for the one or more data attribute identified by the normalized attribute identifiers from the at least two datastores; and generating the report including the data retrieved based on the executing of the at least one modified query.

6. The one or more non-transitory computer-readable media of claim 5, wherein:
   the storage metadata further indicates a storage format of the datastore; and
   the at least one modified query is generated in a language corresponding to the storage format of the datastore.

7. The one or more non-transitory computer-readable media of claim 5, the actions further comprising:
   receiving heuristics data indicating the data retrieval latency for at least one of the at least two datastores; and
   determining the datastore of the at least two datastores, based at least partly on the storage metadata indicating that the data for at least one data attribute identified by the normalized attribute identifiers is stored in the datastore, the determining of the datastore further based on data quality information indicating an age of the data stored in the datastore:
   wherein the determining of the datastore further comprises:
      based at least partly on the storage metadata, identifying the datastore storing the data for the at least one data attribute identified by the normalized attribute identifiers; and
      based at least partly on the heuristics data, determining the datastore based on which of the at least two datastores have the lower data retrieval latency.

8. The one or more non-transitory computer-readable media of claim 5, the actions further comprising:
   receiving heuristics data indicating the data retrieval latency for at least one of the at least two datastores; and
   determining the datastore of the at least two datastores, based at least partly on the storage metadata indicating that data for at least one data attribute identified by the normalized attribute identifiers is stored in the datastore, the determining of the datastore further based on data quality information indicating an age of the data stored in the datastore.

9. The one or more non-transitory computer-readable media of claim 5, wherein the at least two datastores include at least one datastore that employs a non-relational storage format and the at least one datastore that employs a relational storage format.

10. The one or more non-transitory computer-readable media of claim 5, the actions further comprising:
    determining the datastore of the at least two datastores, based at least partly on the storage metadata indicating that the data for at least one data attribute identified by the normalized attribute identifiers is stored in the datastore, the determining of the datastore further based on data quality information indicating an age of the data stored in the datastore;
    wherein the determining of the datastore is further based on time estimates.

11. The one or more non-transitory computer-readable media of claim 5, wherein:
    the at least one modified query is generated to include at least one condition.

12. The one or more non-transitory computer-readable media of claim 5, wherein:
    the format of the syntax tree is different than the at least two different storage formats and further includes ordering information describing an order for at least a portion of the data in the report; and
    the at least one modified query is generated to include the ordering information.

13. The one or more non-transitory computer-readable media of claim 5, wherein the at least one modified query is generated based on heuristics data describing the data retrieval latency to retrieve data from the datastore.

14. A system, comprising:
    at least one data warehouse comprising a plurality of datastores supporting at least two different storage formats;
    at least one memory storing computer-executable instructions; and
    at least one processor in communication with the at least one data warehouse, the at least one processor configured to access the at least one memory and execute the computer-executable instructions to:
       receive a request for a report comprising a syntax tree that includes one or more data attributes identified by an attribute identifier and one or more conditions on the one or more data attributes, the report to be generated by querying the at least one data warehouse, the syntax tree comprising a format that is abstracted from a particular one of the at least two different storage formats of the plurality of datastores;
       normalize the attribute identifiers to generate normalized attribute identifiers for the one or more data attributes to provide a consistent attribute identifier across the at least two datastores;
       receive storage metadata describing at least one of the plurality of datastores storing data for the normalized attribute identifiers, the metadata including a description of the one or more data attributes and data retrieval latency for the plurality of datastores;
       generate at least one query to retrieve data from one or more datastores using the description of the one or more data attributes from the storage metadata and the one or more data attributes obtained from the syntax tree of the request for the report to retrieve data for at least one data attribute identified by the normalized attribute identifiers from the plurality of datastores;
       provide, to at least one data consumer associated with the report, at least one time estimate for generating the report based on retrieving the data for the one or more data attributes identified by the normalized attribute identifiers from individual ones of the at least two datastores, the at least one time estimate based at least partly on the data retrieval latency for the individual ones of the at least two datastores;
       receive a selection of a datastore by the at least one data consumer, the selection provided by the at least one data consumer based on the at least one time estimate;
       modify the at least one query to access the datastore of the plurality of datastores based on the selection of the datastore by the at least one data consumer; and
       generate the report including the data for the at least one data attribute identified by the normalized attribute identifiers, retrieved from the datastore based on an execution of the at least one modified query.

15. The system of claim 14, wherein the plurality of datastores includes at least one datastore that employs a non-relational storage format and at least one datastore that employs a relational storage format.

16. The system of claim 14, wherein:
the storage metadata further comprises information describing a storage format of at least one of the plurality of datastores in the at least one data warehouse; and
the at least one modified query is generated in a language corresponding to the storage format of the at least one of the plurality of datastores.

17. The system of claim 14, wherein the processor is further configured to:
determine the datastore of the plurality of datastores, based at least partly on data retrieval latency information for the datastore, and on the storage metadata indicating that the data for the at least one data attribute identified by the normalized attribute identifiers is stored in the datastore, the determining of the datastore further based on data quality information indicating a quality of the data stored in the datastore;
wherein the determining of the datastore further comprises:
based at least partly on the storage metadata, identifying at least two datastores of the plurality of datastores, the at least two datastores storing the data for the at least one data attribute identified by the normalized attribute identifiers; and
based at least partly on the data retrieval latency information, determining the datastore based on which of the plurality of datastores have a lowest data retrieval latency.

18. The system of claim 14, wherein the processor is further configured to:
determine the datastore of the plurality of datastores, based at least partly on data retrieval latency information for the datastore, and on the storage metadata indicating that data for the at least one data attribute identified by the normalized attribute identifiers is stored in the datastore, the determining of the datastore further based on data quality information indicating a quality of the data stored in the datastore.

19. The system of claim 18, wherein the determining of the datastore is further based on time estimates.

20. The system of claim 14, wherein:
the syntax tree having a first storage format and the plurality of datastores supporting at least a second storage format and a third storage format, the syntax tree further including at least one condition on the at least one data attribute identified by the normalized attribute identifiers, and ordering information describing an order for at least a portion of the data in the report; and
the at least one modified query is generated to include the at least one condition and the ordering information.

* * * * *